M. EWING.
MAP.
APPLICATION FILED MAY 21, 1913.
1,108,159.
Patented Aug. 25, 1914.
2 SHEETS—SHEET 1.
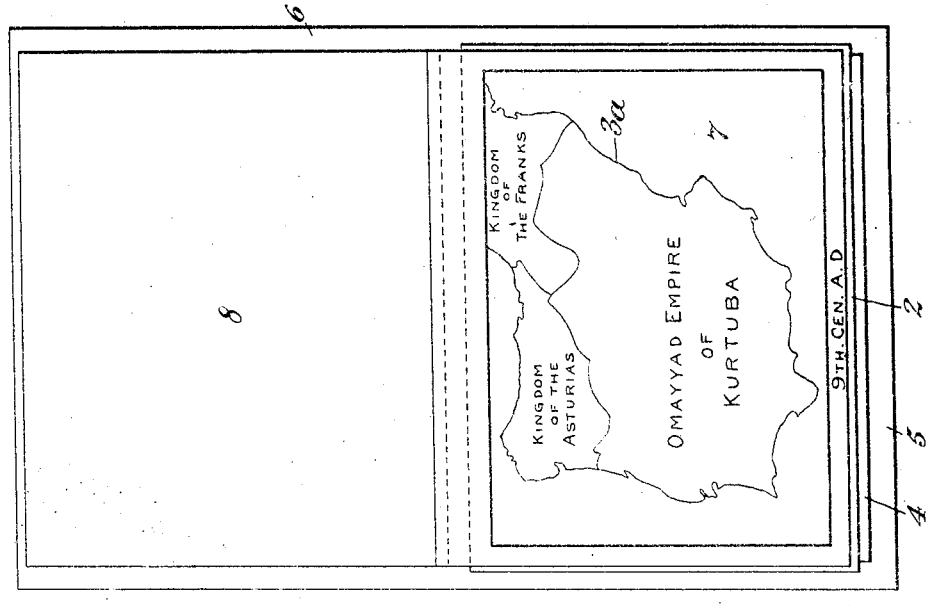
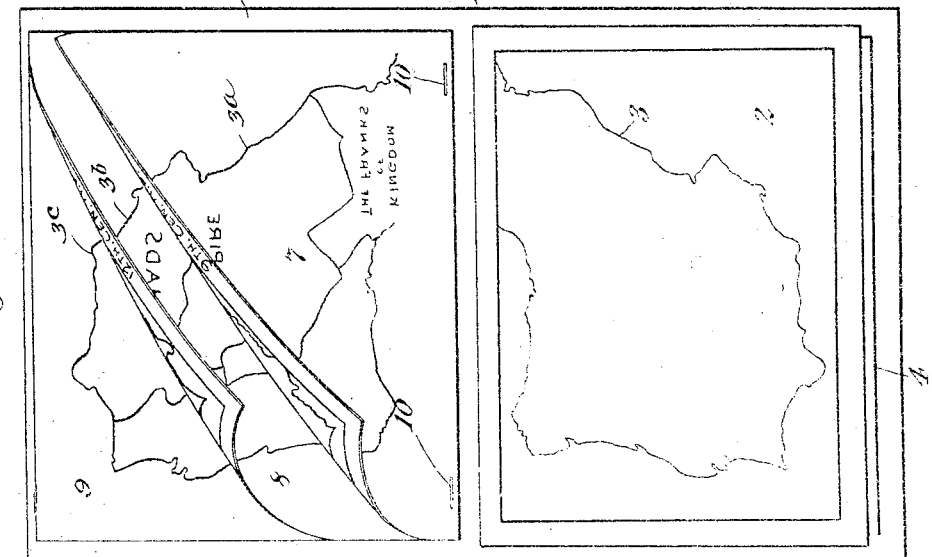
Witnesses:
Inventor:
Maria Ewing
by
Attorney.

M. EWING.
MAP.
APPLICATION FILED MAY 21, 1913.
1,108,159.
Patented Aug. 25, 1914.
2 SHEETS—SHEET 2.
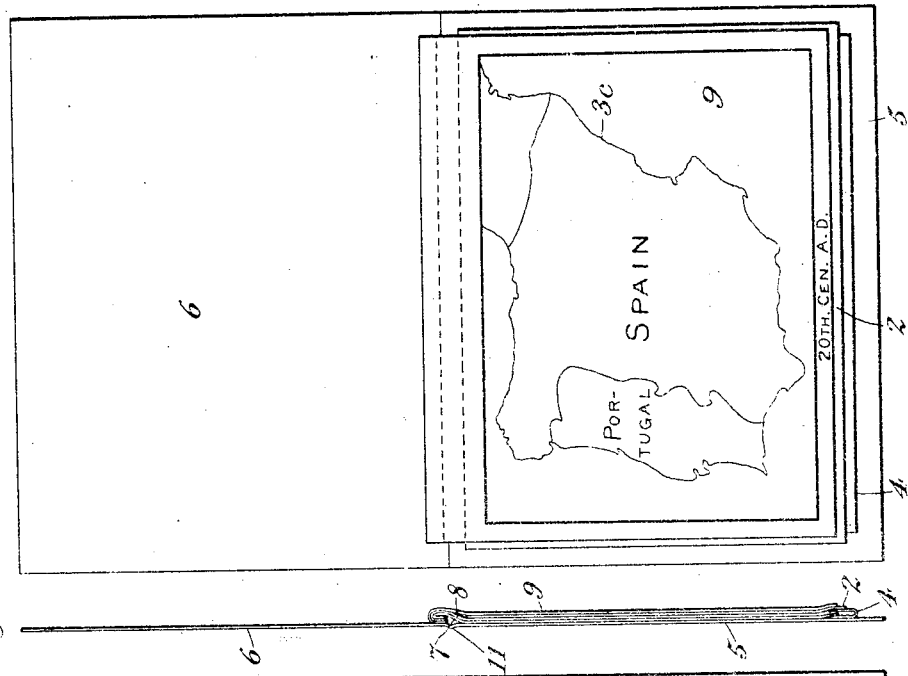
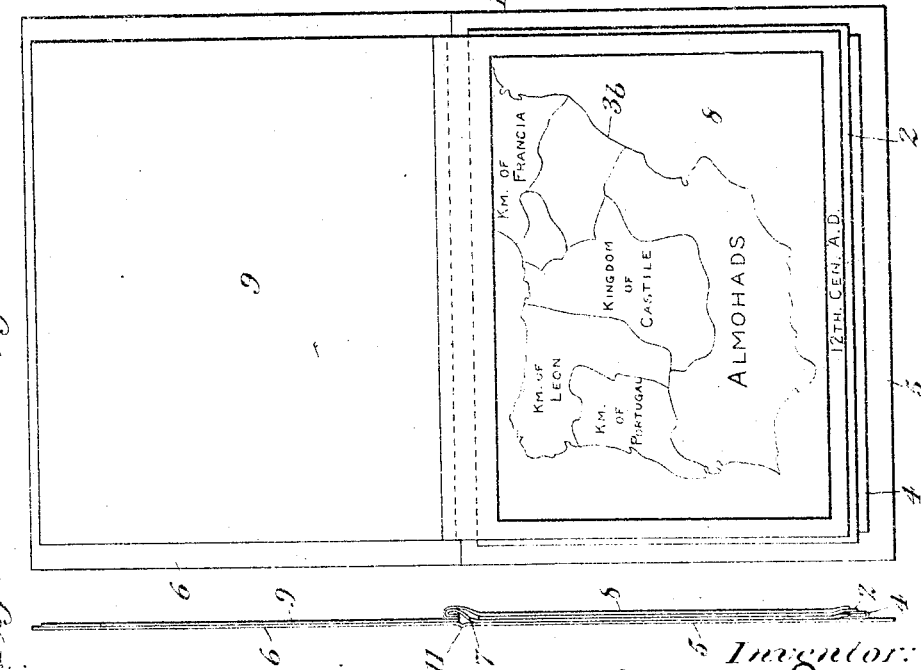
Witnesses:
James H Jones
Noe Eisenstadt
Inventor:
Maria Ewing
by
Attorney.

UNITED STATES PATENT OFFICE.

MARIA EWING, OF TARRYTOWN, NEW YORK.

MAP.

1,108,159.    Specification of Letters Patent.    Patented Aug. 25, 1914.

Application filed May 21, 1913. Serial No. 768,928.

*To all whom it may concern:*

Be it known that I, MARIA EWING, a citizen of the United States, and a resident of Tarrytown, in the county of Westchester and State of New York, have invented certain new and useful Improvements in Maps, of which the following is a specification.

This invention relates to maps, and especially to maps for educational purposes, and the main object of the invention is to provide maps by means of which both the topographical features and the historical development of any given region may be graphically represented in such a manner that both the geographical features and the historical facts may be readily brought into intimate relation or association.

In the accompanying drawings I have illustrated a simple means for carrying my invention into effect, in which—

Figure 1 is an edge view of a folder containing a set of maps embodying the invention; Fig. 2 is a plan or face view of the same with two sheets partly turned up, this view and Fig. 1 illustrating a base map or sheet at one side of the folder and a series of three sheets at the other side thereof, all of which are out of operative relation with the base sheet; Figs. 3 and 4 are views similar to Figs. 1 and 2, showing the first sheet of the set at one side of the folder brought into position to register with the base sheet at the other side of said folder; Figs. 5 and 6 are views similar to Figs. 1 and 2, except that they show the first sheet of said set folded under the base sheet and the second sheet folded over upon the base sheet, and Figs. 7 and 8 are similar views, showing the first and second sheets of the set folded under the base sheet and the third upon and registering with said base sheet.

Similar characters designate like parts in all the figures of the drawings.

My invention may be embodied in any suitable construction permitting superimposition of a plurality of map sheets one of which is a base sheet and the other or others of which is or are normally positioned at one side of the base sheet and adapted to be swung over upon it to bring maps of like outline on said sheets into registration, one at a time, with a corresponding map on the base sheet. This base sheet may be any suitable for the purpose and will contain a map, the outline of which will represent any given portion of the earth's surface. It will also preferably contain a showing of all the natural features of that particular portion of the earth's surface which it is desired to study or which are of sufficient importance to be made prominent on said base map. Ordinarily mountain chains, rivers, and many other features of the surface in question will be shown on this base map, but for simplicity and clearness all features except the outline of the territory in question have been omitted from the present drawings. A base sheet suitable for the purpose is indicated at 2, and an outline map is shown thereon at 3, which map, it will be understood, may contain a graphical representation of any or all the topographical features, etc., of the region in question. This base map is secured or hinged as at 4, at its outer edge to one member, 5, of a cover or back within which each of the maps of the set is intended to be inclosed, and the inner edge of the sheet 2 is free to swing about the hinge member 4 to permit sheets carried by the other member, 6, of the cover to be brought into position to coöperate, one at a time, with the base sheet 2. Here, for simplicity, but three sheets are shown as secured to the cover member 6, these being attached near their inner edges by any suitable means, such as 10, to the cover at a point near the hinge, 11, thereof. Said three sheets are designated by 7, 8 and 9 respectively. Each is approximately the same size as the base sheet 2 and each has an outline map thereon like that shown at 3, and this outline map is designated in Figs. 4, 6 and 8 respectively by $3^a$, $3^b$ and $3^c$. The outline is so placed on each of the sheets 7, 8 and 9 that when these sheets are turned over on to the sheet 2 the outlines $3^a$, $3^b$ and $3^c$ respectively will register with the outline 3.

The material of the base sheet 2 may, of course, be any suitable for the purpose and will usually be relatively opaque, but the sheets 7, 8 and 9 should be of transparent material, such as tracing paper, linen, celluloid, etc., in order that the topographical and other features of the base map 3 may show clearly through each superimposed sheet 7, 8 or 9. While the sheets 7, 8 and 9 are all so printed that their respective map outlines register with one another, and are all hinged to the cover near their inner edges so that they may be swung from their outer edges over on to the base map, the other indications on the maps of the sheets 7, 8 and 9 differ from one another and, of course, also from the indications contained within the outline of the map on the base sheet 2. Thus the outline 3ª contains within it, as indicated in Fig. 4, indications of the political divisions of the Spanish peninsula, during the ninth century A. D., these different indications clearly illustrating graphically the political subdivisions of the territory of the peninsula during said period. In Fig. 6 the political subdivisions indicated are different from those shown in Fig. 4 and represent the political conditions existing so far as territorial subdivision and nomenclature are concerned during the twelfth century A. D. In a similar manner Fig. 8 illustrates corresponding subdivisions, etc., for the present time.

It will of course be obvious that the history of the particular portion of the earth's surface illustrated in these drawings may be graphically represented, in a manner similar to that indicated, for each and every century, from the beginning of the history of the region in question, or for any other periods desired; and it will also be clear that large numbers of other kinds and grades of historical information may be shown on such maps, and the history, in connection with the geography, of any particular portion of the earth's surface quickly indicated from the earliest times down to the present time, the object being so to associate the history of the development of any particular country or region with the geography thereof that both the history and the geography of such region for any particular period will appear at a glance.

An important feature of such a set of maps as this is that each map indicating a particular period of the history of the region in question should not only be combined with a base map or sheet in such a manner as to be readily associated with it, as by superimposition, for educational purposes, but should also be so combined with the base sheet that it may be quickly gotten out of the way and another sheet representing another period brought into position to register with the base map. The manner in which this is done in the present case will be clear by referring to the figures consecutively, from which it will be seen that sheets 7, 8 and 9 are brought one at a time over upon the base map and are then swung under said base map one at a time when a map of a new period is to be brought into position for use. The hinge member 4, in addition to constituting a hinge for the attachment of the sheet 2, also serves, as will be evident by reference to Figs. 5 and 7, as a means for spacing the sheets properly when a considerable number of sheets have to be used in connection with the base sheet and folded under it as indicated in Fig. 7.

What I claim is:

1. In an article of the class described, the combination with a hinged cover, of a pair of map sheets one being a relatively opaque base sheet secured at its outer edge to an outer edge of the cover and the other being a transparent sheet hinged at its inner edge near the hinge of the cover and containing a map of like outline to said base map and having within said outline indications differing from those of said base map, said transparent map being adapted to be swung over on to the base sheet to bring its map outline into registration with that of said base map and also adapted to be swung under said base map and covered thereby.

2. In an article of the class described, the combination with a hinged cover, of a pair of map sheets one being a relatively opaque base sheet hinged at its outer edge to an outer edge of the cover for swinging movement, and the other being a transparent sheet hinged at its inner edge near the hinge of the cover and containing a map of like outline to said base map and having within said outline indications differing from those of said base map, said transparent map being adapted to be swung over on to the base sheet to bring its map outline into registration with that of said base map and also adapted to be swung under said base map and covered thereby.

3. In an article of the class described, the combination with a hinged cover, of a relatively opaque base sheet secured at its outer edge to an outer edge of the cover and containing a base map, and a plurality of transparent sheets hinged at their inner edges near the hinge of the cover and each containing a map of like outline to said base map but having within said outline indications differing from those of every other map, each of said transparent maps being adapted to be swung over on to the base sheet to bring its map outline into registration with that of said base map.

4. In an article of the class described, the combination with a hinged cover, of a relatively opaque base sheet hinged at its outer edge to an outer edge of the cover for swinging movement and containing a base map, and a plurality of transparent sheets hinged at their inner edges near the hinge of the cover and each containing a map of like outline to said base map but having within said outline indications differing from those of every other map, each of said transparent maps being adapted to be swung over on to the base sheet to bring its map outline into registration with that of said base map.

5. In an article of the class described, the combination with a hinged cover, of a relatively opaque base sheet hinged at its outer edge to an outer edge of the cover for swinging movement and containing a base map, and a plurality of transparent sheets hinged at their inner edges along a common line near the hinge of the cover and each containing a map of like outline to said base map but having within said outline indications differing from those of every other map, each of said transparent maps being adapted to be swung over on to the base sheet to bring its map outline into registration with that of said base map.

Signed at New York in the county of New York and State of New York this 7th day of May, A. D. 1913.

MARIA EWING.

Witnesses:
C. S. CHAMPION,
ANNE C. BARNES.